United States Patent [19]

Ueda

[11] Patent Number: 5,134,522

[45] Date of Patent: Jul. 28, 1992

[54] PROJECTION LENS SYSTEM

[75] Inventor: Toshihiko Ueda, Toyokawa, Japan

[73] Assignee: Minolta Camera Co., Ltd., Osaka, Japan

[21] Appl. No.: 652,421

[22] Filed: Feb. 4, 1991

[30] Foreign Application Priority Data

Feb. 5, 1990 [JP] Japan .................. 2-25683

[51] Int. Cl.$^5$ .............................. G02B 3/02
[52] U.S. Cl. ...................... 359/642; 359/648
[58] Field of Search .............. 350/409, 412, 432; 359/642, 648, 708

[56] References Cited

U.S. PATENT DOCUMENTS

| 2,649,021 | 8/1953 | Angenieux | 350/412 |
| 2,989,895 | 6/1961 | Sandback | 350/412 |
| 5,015,076 | 5/1991 | Ueda | 350/432 |

FOREIGN PATENT DOCUMENTS

| 4735028 | 9/1972 | Japan . |
| 57-4016 | 1/1982 | Japan . |

Primary Examiner—Janice A. Howell
Assistant Examiner—Richard Hanig
Attorney, Agent, or Firm—Price, Gess & Ubell

[57] ABSTRACT

A projection lens system having a first positive lens group which includes a positive lens having a strongly convex surface facing the enlarged side and a negative lens, a seond negative lens group which includes a positive lens and a lens in the form of a negative meniscus lens having a concave surface facing the enlarged side, a third lens group which includes a lens in the form of a meniscus lens, wherein at least one lens surface is aspherical, having a concave surface facing the enlarged side, and a diaphragm is arranged between the first positive lens group and the second negative lens group, and wherein said projection lens system is standardized by the conditional expression to form compactly.

3 Claims, 4 Drawing Sheets

PROJECTION LENS SYSTEM

BACKGROUND OF THE INVENTION

1. Field of the Invention

The present invention relates to a microfilm projection lens system for use in microfilm reader or reader printers and the like to reproduce microfilm images.

2. Description of the Related Art

Microfilm frequently records each frame character and image condition without longitude-latitude standardization. Therefore, during image reproduction (image projection), a prism is disposed between the projection lens and screen, i.e., on the enlargement side of the projection lens, so as to rotate the image and correct longitude-latitude orientation of the reproduced image projected onto a screen.

Conventional projection lens systems, however, must provide an exceptionally large image rotating prism even when said prism is disposed in near proximity to the end face of the enlarging side of the projection lens due to a broadening of the luminous flux which occurs particularly when the angle of field of the projection lens is a wide field angle so as to allow positioning of the entrance pupil at the virtual center of the projection lens system. Further, the image rotating prism is equivalent to a plate parallel to the optical axis arranged so as to be capable of inclination at a 45° angle, the characteristics of which differ depending on position. The aforesaid arrangement has disadvantages inasmuch as the amount of astigmatism produced on the axis increases (astigmatism on the axis is proportional to the length of the bottom face of the prism) as the image rotating prism becomes larger, thereby causing image deterioration, and eventually increasing the overall size of the entire projection optical system including mirrors.

Therefore, various so-called front diaphragm type projection lens systems have been proposed that position the entrance pupil at the edge of the projection lens for maximum focusing of the luminous flux.

In general, front diaphragm type projection lenses produce large curvature of field and astigmatism because the usable field angle is narrow, and coma aberration is difficult to correct in large field angle lens systems.

It is, moreover, extremely difficult to make such a projection lens system in a compact form. Additional very important disadvantages to the aforesaid front diaphragm type of projection lens system are the limited glass material combinations for simultaneous correction of color aberration on the axis and magnification color aberration.

SUMMARY OF THE INVENTION

Accordingly, a main object of the present invention is to provide an improved projection lens system capable of eliminating the previously described disadvantages.

A further object of the present invention is to provide an extremely compact projection lens system capable of eliminating the previously described disadvantages.

A still further object of the present invention is to provide a projection lens system having superior characteristics and which is extremely compact in form with a telephoto ratio (TL∞/f) of about 0.8 or less, and a small image rotating prism with a field angle (2ω) of about 30°, an f-number of 8, and which is capable of sufficiently correcting various types of aberration.

These and other objects are attained by a projection lens system comprising sequentially from the enlarging side:

a first positive lens group providing a positive lens having a strongly convex surface facing the enlarging side, and a negative lens;

a second negative lens group providing a positive lens, and a lens in the form of a negative meniscus lens having a concave surface facing the enlarging side; and a third lens group providing a fifth lens in the form of a meniscus lens, wherein at least one lens surface is aspherical, having a concave surface facing the enlarging side;

said projection lens system providing a diaphragm arranged in near proximity to the edge of the first positive lens group on the enlarging side, and satisfying the following conditional expression:

$$-1.2 < f/f_m < 0.5$$

Moreover, the objects are attained by a projection lens system comprising sequentially from the enlarging side:

a first positive lens group providing a positive lens having a strongly convex surface facing the enlarging side, and a negative lens;

a second negative lens group providing a positive lens, and a lens in the form of a negative meniscus lens having a concave surface facing the enlarging side; and a third lens group providing a lens in the form of a meniscus lens, wherein at least one lens surface is aspherical, having a concave surface facing the enlarging side;

said projection lens system providing a diaphragm arranged between the first positive lens group and the second negative lens group, and satisfying the following conditional expression:

$$-1.2 < f/f_m < 0.5$$

where
f: overall focal length
$f_m$: focal length of the third lens group

BRIEF DESCRIPTION OF THE DRAWINGS

These and other objects or features of the present invention will become apparent from the following description of the preferred embodiments thereof taken in conjunction with the accompanying drawings, in which.

In the following description, like parts are designated by like reference numbers throughout the several drawings.

DESCRIPTION OF THE PREFERRED EMBODIMENTS

The preferred embodiments of the present invention are described hereinafter with reference to the accompanying drawings.

Figure 1:
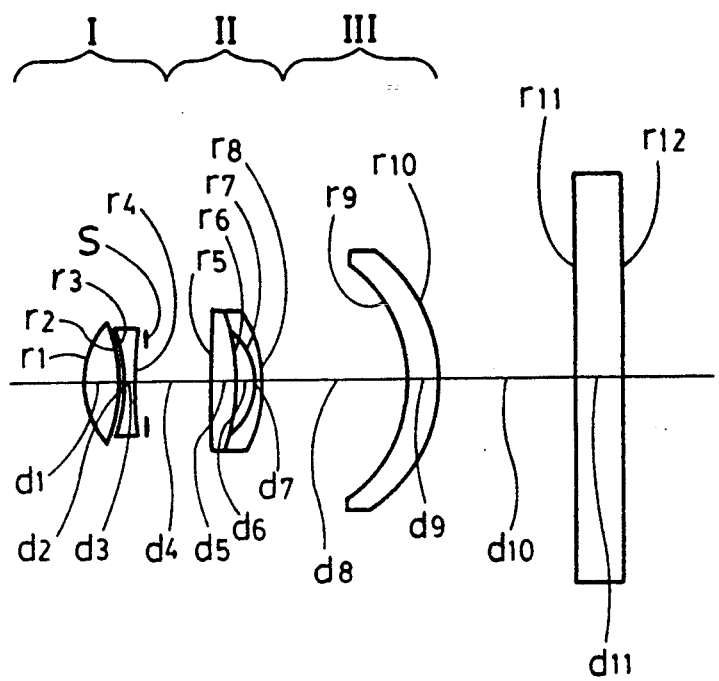
FIGS. 1, 3, 5 and 7 are section views showing the lens construction in the first, second, third and fourth embodiments of the present invention.
Figure 2:
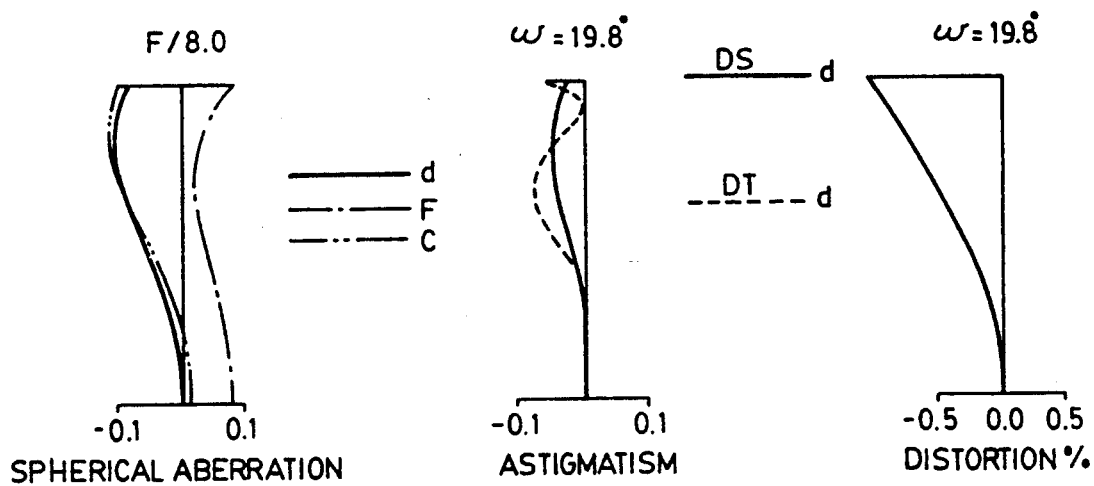
FIGS. 2, 4, 6 and 8 show aberration curves of the projection lens system of the first, second, third and fourth embodiments, respectively.
Figure 3:
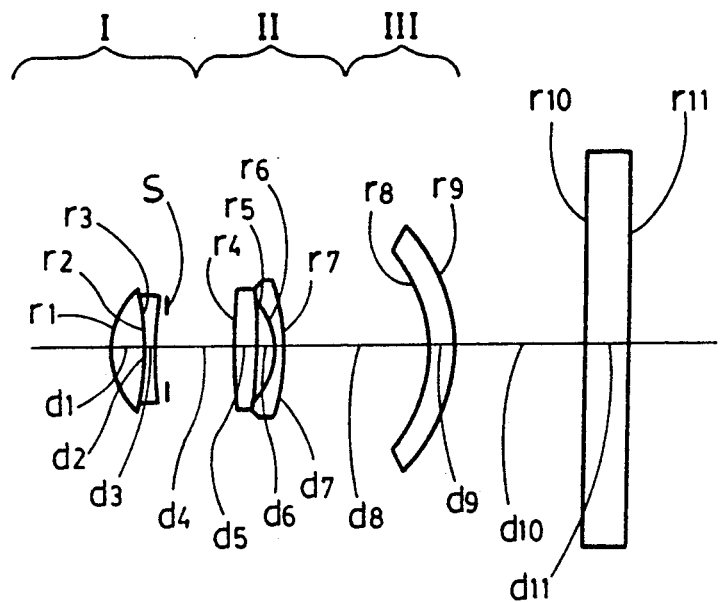
Figure 4:
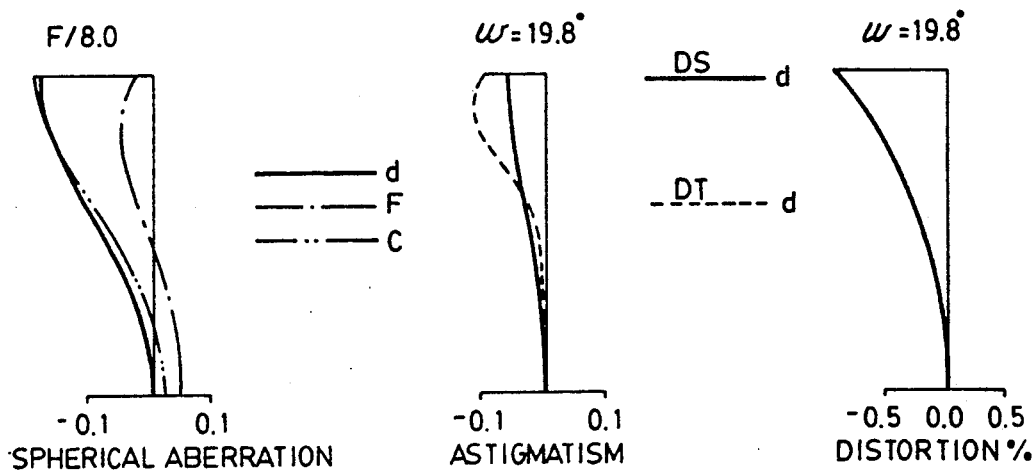
Figure 5:
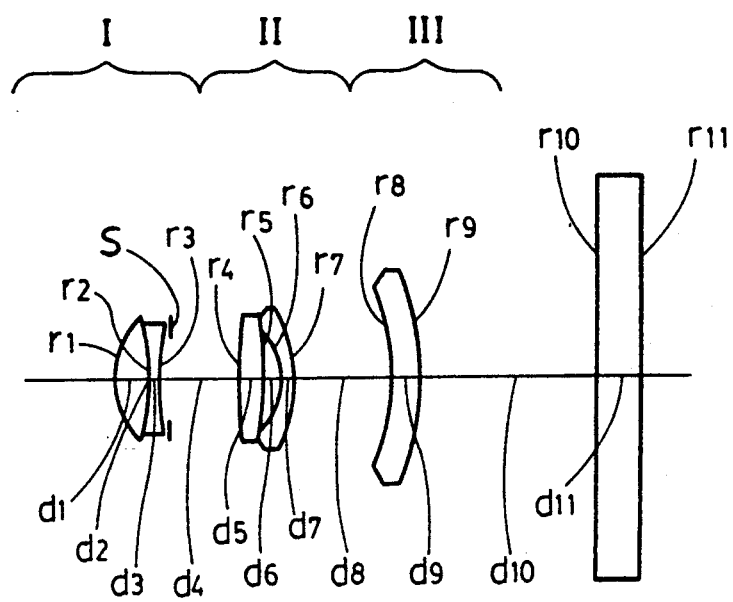
Figure 6:
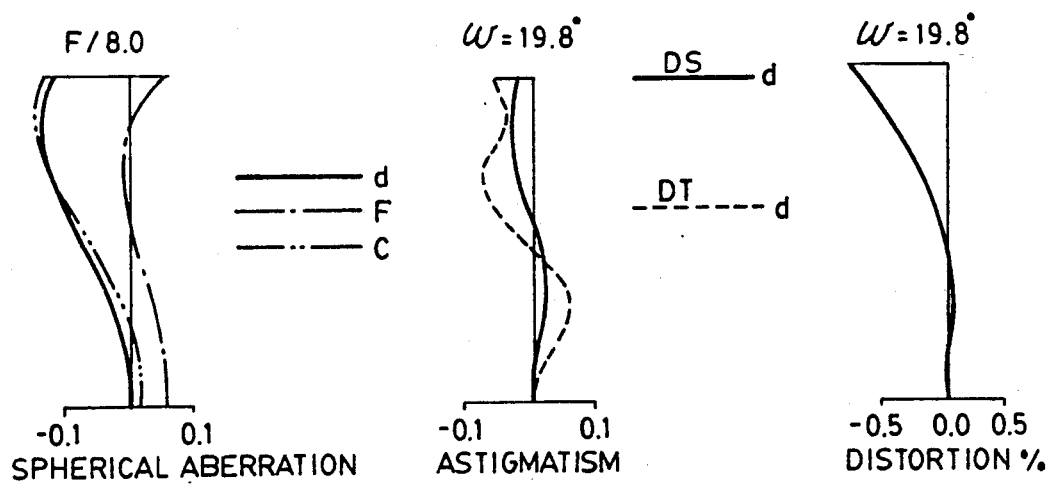
Figure 7:
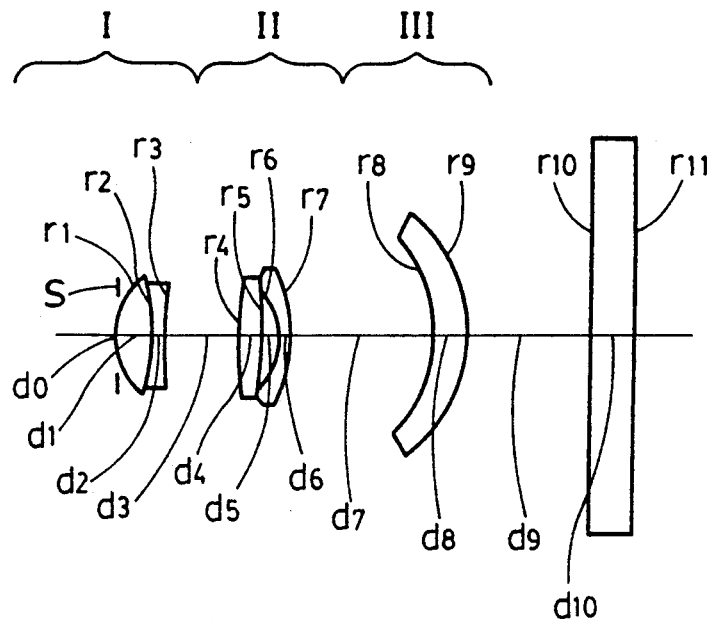
Figure 8:
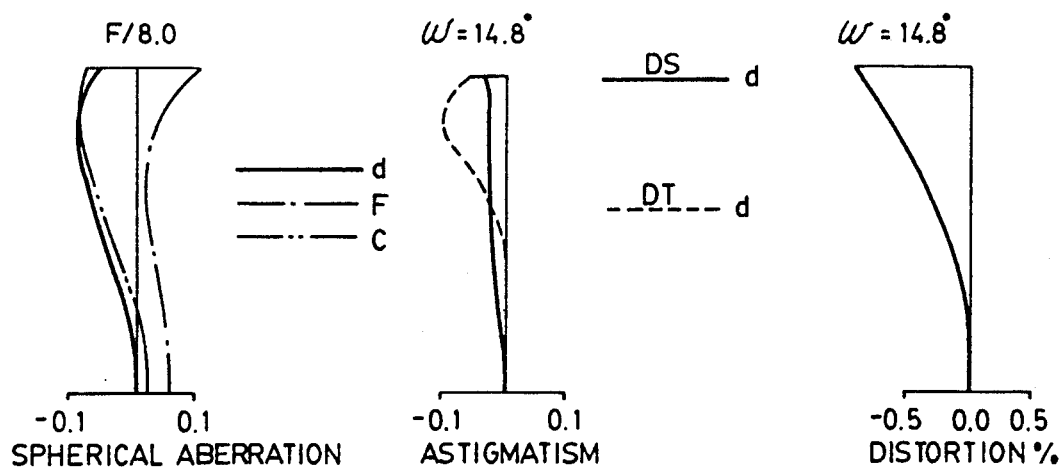

FIG. 1 is a section view showing the construction of one example of the microfilm projection lens system using an image rotating prism of the present invention.

The projection lens system comprises, sequentially from the enlarging side on the left, a first positive lens group I providing a first positive lens and a second negative lens, a second negative lens group II providing a third positive lens and a fourth lens in the form of a negative meniscus lens having a concave surface facing the enlarging side, a third lens group III providing a fifth lens in the form of a meniscus lens wherein at least one lens surface is aspherical and has a concave surface facing the enlarging side, and a diaphragm is arranged between the lens edge on the enlarging side in the first positive lens group and the lens edge on the enlarging side in the second negative lens group, and said projection lens system satisfies the following equation:

$$-1.2 < f/fm < 0.5 \quad (1)$$

when f is the overall focal length of the lens system and fm is the focal length of the third lens group.

More specifically, the present invention preferably satisfies the following equations $$0.4 < f_I/f < 0.7 \quad (2)$$

$$0.2 < E_I/f < 0.4 \quad (3)$$

when $f_I$ is the focal length of the first lens group, and $E_I$ is the thin layer conversion spacing (distance between the main flat surface at the back side of the first lens group I and the main flat surface at the front side of the second lens group II) between the first lens group and the second lens group.

The first lens group I is disposed on the enlarging side, i.e., on the screen side, and is a so-called doublet type lens group. This type of lens is suitable for use as a front diaphragm type lens system, and has been suited for use as the front lens groups in a telephotographic type lens system.

The second lens group II contributes to the correction of spherical aberration, which is inadequately corrected mainly by the first lens group I, as well as correction for curvature of field and coma aberration.

The third lens group III is a weak meniscus lens. In the present invention, the third lens group III has at least one lens surface that is aspherical on the reducing side, and which contributes to the correction of curvature of field and distortion.

The previously mentioned Equation 1 sets the conditions of refracting power for the third lens group III, such that if the lower limit value of the equation is exceeded, error sensitivity (deterioration of lens characteristics) becomes more severe; and if the upper limit value is exceeded, the lens system cannot achieve a compact form.

The previously mentioned Equations 2 and 3 set the conditions for reducing the telephoto ratio. If the upper limit value of Equation 2 and the lower limit value of Equation 3 are exceeded, the lens systems cannot be achieved in a compact form. Further, if the lower limit value of Equation 2 and the upper limit value of Equation 3 are exceeded, it becomes difficult to correct for spherical aberration and coma aberration.

When an aspherical lens is arranged on the enlarging side of the third lens group III, it is desirable to displace the amount of displacement of the aspherical surface from the reference spherical surface to the reducing side. Curvature of field and distortion can thereby be readily corrected.

The first lens group I can produce sufficient aberration characteristics as a cemented lens, and may usefully have a lens barrel construction.

The diaphragm S is arranged in near proximity to the edge of the lens on the enlarging side of the first lens group I, or between the first lens group I and the second lens group II. If the diaphragm S is disposed so as to be moved from the aforesaid range toward the reducing side, the image rotating prism, which is arranged on the edge at the enlarging side of the lens system, must be larger. Further, if the diaphragm S is disposed so as to be moved from the aforesaid range toward the enlarging side, the overall length of the lens system becomes larger.

When the diaphragm S is arranged between the first lens group I and the second lens group II, said diaphragm S is most effective relative to the previously described disadvantages when disposed in near proximity to the first lens group I.

Specific lens constructions of the first through fourth examples of the projection lens systems of the present invention are described in Tables 1 through 4, while the lens constructions are illustrated in FIGS. 1, 3, 5 and 7, respectively. Each table shows, sequentially from the enlarging side, i.e., the screen side, on the left, numerical values for radii of curvature: $r_1, r_2, \ldots r_n$; spacing on the axis: $d_1, d_2, \ldots d_n$; refractive indices on the D-line: $N_1, N_2, \ldots N_n$; Abbe numbers $v_1, v_2, \ldots v_n$ for each material of each lens. FIGS. 2, 4, 6 and 8 show the spherical aberration, astigmatism and distortion in aberration curves for the respective examples.

The aspherical surface coefficient $A_i$ shown in each table is derived from the following equation when $y^2 + z^2 = \phi^2$, and wherein the optical axis is designated the x-axis, and the aspherical surface is expressed as $x = f(y,z)$ when the y-axis and z-axis intersecting coordinates within the $x = 0$ plane.

$$X = \frac{C_0\phi^2}{1 + (1 - C_0^2\phi^2)^{-\frac{1}{2}}} + \sum_{i=2}^{18} + Ai\phi^i$$

The value $C_0$ is a reciprocal of the radius of curvature. The aspherical surface coefficients are shown in Table 1 No. 2 through Table 4 No. 2.

Numerical values for each of the conditional equations of each example are shown in Table 5.

TABLE 1 (No. 1)

| | | f = 42.9, f-number = 8.0 | | | | |
|---|---|---|---|---|---|---|
| | Radius of curvature | | Spacing on axis | | Refractive index (Nd) | Abbe No. (vd) |
| $r_1$ | 6.43 | | | | | |
| | | $d_1$ | 2.2 | $N_1$ | 1.4875 | $v_1$ 70.4 |
| $r_2$ | −22.22 | | | | | |
| | | $d_2$ | 0.4 | | | |
| $r_3$ | −18.69 | | | | | |
| | | $d_3$ | 1.0 | $N_2$ | 1.8075 | $v_2$ 35.4 |
| $r_4$ | 34.46 | | | | | |
| | | $d_4$ | 0.5 | | | |
| S | | | | | | |
| | | $d_5$ | 4.9 | | | |
| $r_5$ | 95.97 | | | | | |
| | | $d_6$ | 1.5 | $N_3$ | 1.6734 | $v_3$ 29.3 |
| $r_6$ | −33.48 | | | | | |
| | | $d_7$ | 1.5 | | | |
| $r_7$ | −4.84 | | | | | |
| | | $d_8$ | 0.7 | $N_4$ | 1.6405 | $v_4$ 60.1 |
| $r_8$ | −8.74 | | | | | |
| | | $d_9$ | 9.9 | | | |
| $r_9$* | −9.15 | | | | | |
| | | $d_{10}$ | 2.0 | $N_5$ | 1.6968 | $v_5$ 56.5 |

TABLE 1 (No. 1)-continued f = 42.9, f-number = 8.0

| Radius of curvature | Spacing on axis | | Refractive index (Nd) | | Abbe No. (vd) | |
|---|---|---|---|---|---|---|
| $r_{10}$  −10.91 | | | | | | |
| | $d_{11}$ | 9.6 | | | | |
| $r_{11}$  ∞ | | | | | | |
| | $d_{12}$ | 3.0 | $N_6$ | 1.5168 | $v_6$ | 64.2 |
| $r_{12}$  ∞ | | | | | | |
| ∑d = 37.035 | | | | | | |

TABLE 2 (No. 1)

f = 42.9, f-number = 8.0

| Radius of curvature | Spacing on axis | | Refractive index (Nd) | | Abbe No. (vd) | |
|---|---|---|---|---|---|---|
| $r_1$  6.41 | | | | | | |
| | $d_1$ | 2.2 | $N_1$ | 1.4875 | $v_1$ | 70.4 |
| $r_2$  −22.54 | | | | | | |
| | $d_2$ | 1.0 | $N_2$ | 1.8075 | $v_2$ | 35.4 |
| $r_3$  32.72 | | | | | | |
| | $d_3$ | 0.5 | | | | |
| S | | | | | | |
| | $d_4$ | 5.0 | | | | |
| $r_4$  93.59 | | | | | | |
| | $d_5$ | 1.5 | $N_3$ | 1.6734 | $v_3$ | 29.3 |
| $r_5$  −28.96 | | | | | | |
| | $d_6$ | 1.5 | | | | |
| $r_6$  −4.94 | | | | | | |
| | $d_7$ | 0.7 | $N_4$ | 1.6405 | $v_4$ | 60.1 |
| $r_7$  −10.66 | | | | | | |
| | $d_8$ | 10.4 | | | | |
| $r_8^*$  −9.72 | | | | | | |
| | $d_9$ | 2.0 | $N_5$ | 1.6968 | $v_5$ | 56.5 |
| $r_9$  −11.36 | | | | | | |
| | $d_{10}$ | 9.2 | | | | |
| $r_{10}$  ∞ | | | | | | |
| | $d_{11}$ | 3.0 | $N_6$ | 1.5168 | $v_6$ | 64.2 |
| $r_{11}$  ∞ | | | | | | |
| ∑d = 36.908 | | | | | | |

TABLE 3 (No. 1)

f = 42.9, f-number = 8.0

| Radius of curvature | Spacing on axis | | Refractive index (Nd) | | Abbe No. (vd) | |
|---|---|---|---|---|---|---|
| $r_1$  6.37 | | | | | | |
| | $d_1$ | 2.2 | $N_1$ | 1.4875 | $v_1$ | 70.4 |
| $r_2$  −21.59 | | | | | | |
| | $d_2$ | 1.0 | $N_2$ | 1.8075 | $v_2$ | 35.4 |
| $r_3$  28.29 | | | | | | |
| | $d_3$ | 0.5 | | | | |

TABLE 3 (No. 1)-continued f = 42.9, f-number = 8.0

| Radius of curvature | Spacing on axis | | Refractive index (Nd) | | Abbe No. (vd) | |
|---|---|---|---|---|---|---|
| S | | | | | | |
| | $d_4$ | 5.0 | | | | |
| $r_4$  87.58 | | | | | | |
| | $d_5$ | 1.5 | $N_3$ | 1.6734 | $v_3$ | 29.3 |
| $r_5$  −23.35 | | | | | | |
| | $d_6$ | 1.5 | | | | |
| $r_6$  −5.03 | | | | | | |
| | $d_7$ | 0.7 | $N_4$ | 1.6405 | $v_4$ | 60.1 |
| $r_7$  −9.74 | | | | | | |
| | $d_8$ | 7.1 | | | | |
| $r_8^*$  −11.58 | | | | | | |
| | $d_9$ | 2.0 | $N_5$ | 1.6968 | $v_5$ | 56.5 |
| $r_9$  −17.53 | | | | | | |
| | $d_{10}$ | 12.5 | | | | |
| $r_{10}$  ∞ | | | | | | |
| | $d_{11}$ | 3.0 | $N_6$ | 1.5168 | $v_6$ | 64.2 |
| $r_{11}$  ∞ | | | | | | |
| ∑d = 36.976 | | | | | | |

TABLE 4 (No. 1)

f = 42.9, f-number = 8.0

| Radius of curvature | Spacing on axis | | Refractive index (Nd) | | Abbe No. (vd) | |
|---|---|---|---|---|---|---|
| S | | | | | | |
| | $d_0$ | 0.0 | | | | |
| $r_1$  6.44 | | | | | | |
| | $d_1$ | 2.2 | $N_1$ | 1.4875 | $v_1$ | 70.4 |
| $r_2$  −22.16 | | | | | | |
| | $d_2$ | 1.0 | $N_2$ | 1.8075 | $v_2$ | 35.4 |
| $r_3$  33.24 | | | | | | |
| | $d_3$ | 5.5 | | | | |
| $r_4$  87.66 | | | | | | |
| | $d_4$ | 1.5 | $N_3$ | 1.6734 | $v_3$ | 29.3 |
| $r_5$  −29.45 | | | | | | |
| | $d_5$ | 1.5 | | | | |
| $r_6$  −4.96 | | | | | | |
| | $d_6$ | 0.7 | $N_4$ | 1.6405 | $v_4$ | 60.1 |
| $r_7$  −10.70 | | | | | | |
| | $d_7$ | 10.4 | | | | |
| $r_8^*$  −9.59 | | | | | | |
| | $d_8$ | 2.0 | $N_5$ | 1.6968 | $v_5$ | 56.5 |
| $r_9$  −11.19 | | | | | | |
| | $d_9$ | 9.2 | | | | |
| $r_{10}$  ∞ | | | | | | |
| | $d_{10}$ | 3.0 | $N_6$ | 1.5168 | $v_6$ | 64.2 |
| $r_{11}$  ∞ | | | | | | |
| ∑d = 36.909 | | | | | | |

TABLE 1 (No. 2)

Spherical Surface Coefficient $r_9$: $A_2 = 0.0$  $A_3 = 0.0$  $A_4 = 0.57656 \cdot 10^{-4}$  $A_5 = 0.0$
$A_6 = 0.90468 \cdot 10^{-6}$  $A_7 = 0.0$  $A_8 = 0.36597 \cdot 10^{-8}$  $A_9 = 0.0$
$A_{10} = -0.36411 \cdot 10^{-9}$  $A_{11} = 0.0$  $A_{12} = 0.71160 \cdot 10^{-11}$  $A_{13} = 0.0$
$A_{14} = 0.0$  $A_{15} = 0.0$  $A_{16} = 0.0$

TABLE 2 (No. 2)

Spherical Surface Coefficient $r_8$: $A_2 = 0.0$  $A_3 = 0.0$  $A_4 = 0.49687 \cdot 10^{-4}$  $A_5 = 0.0$
$A_6 = 0.81212 \cdot 10^{-7}$  $A_7 = 0.0$  $A_8 = 0.17589 \cdot 10^{-7}$  $A_9 = 0.0$
$A_{10} = -0.24237 \cdot 10^{-9}$  $A_{11} = 0.0$  $A_{12} = 0.21312 \cdot 10^{-11}$  $A_{13} = 0.0$
$A_{14} = 0.0$  $A_{15} = 0.0$  $A_{16} = 0.0$

TABLE 3 (No. 2)

Spherical Surface Coefficient $r_8$: $A_2 = 0.0$  $A_3 = 0.0$  $A_4 = 0.49687 \cdot 10^{-4}$  $A_5 = 0.0$
$A_6 = 0.45787 \cdot 10^{-5}$  $A_7 = 0.0$  $A_8 = -0.19724 \cdot 10^{-6}$  $A_9 = 0.0$
$A_{10} = 0.48213 \cdot 10^{-8}$  $A_{11} = 0.0$  $A_{12} = -0.44311 \cdot 10^{-10}$  $A_{13} = 0.0$

TABLE 3 (No. 2)-continued

Spherical Surface Coefficient

| $A_{14} = 0.0$ | $A_{15} = 0.0$ | $A_{16} = 0.0$ |

TABLE 4 (No. 2)

Spherical Surface Coefficient $r_8$:
$A_2 = 0.0$         $A_3 = 0.0$     $A_4 = 0.49687 \cdot 10^{-4}$    $A_5 = 0.0$
$A_6 = 0.81212 \cdot 10^{-7}$    $A_7 = 0.0$     $A_8 = 0.17589 \cdot 10^{-7}$    $A_9 = 0.0$
$A_{10} = -0.24237 \cdot 10^{-9}$    $A_{11} = 0.0$    $A_{12} = 0.21312 \cdot 10^{-11}$    $A_{13} = 0.0$
$A_{14} = 0.0$    $A_{15} = 0.0$    $A_{16} = 0.0$

TABLE 5

| Example | 1 | 2 | 3 | 4 |
|---|---|---|---|---|
| f | 42.9 | 42.9 | 42.9 | 42.9 |
| field angle 2ω | 29.6° | 29.6° | 29.6° | 29.6° |
| f/fm | −0.279 | −0.221 | −0.758 | −0.219 |
| $f_1/f$ | 0.59 | 0.55 | 0.60 | 0.55 |
| $E_1/f$ | 0.30 | 0.29 | 0.32 | 0.29 |

The projection lens system described above provides an image rotating prism on the enlarging side to project microfilm images, and disposes the entrance pupil position in near proximity to the enlarging side for maximum focusing of luminous flux. The invention further attains a minimum limit of projection image deterioration by disposing the image rotating prism at a position near the edge surface, and thereby also provides the image rotating prism and projection lens system in an overall compact form. A five layer construction can be achieved by using an aspherical surface in the third lens group III, so as to lower the cost of production.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A projection lens system comprising, in order from the enlarging side:

a first positive lens group providing a positive lens having a strongly convex surface facing the enlarging side, and a negative lens;

a second negative lens group providing a positive lens, and a lens in the form of a negative meniscus lens having a concave surface facing the enlarging side; and a third lens group providing a fifth lens in the form of a meniscus lens, wherein at least one lens surface is aspherical, having a concave surface facing the enlarging side;

said projection lens system providing a diaphragm arranged in near proximity to the edge of the first positive lens group on the enlarging side, and satisfying the following conditional expression:

$$-1.2 < f/f_m < 0.5$$

where f is overall focal length and fm is focal length of the third lens group.

2. A projection lens system as claimed in claim 1, wherein said positive lens and negative lens of said first lens group are formed as a cemented lens.

3. A projection lens system as claimed in claim 1, further satisfying the following conditional expressions:

$$0.4 < f_f/f < 0.7$$

$$0.2 < E_f/f < 0.4$$

where $f_I$ is focal length of the first lens group and $E_I$ is the thin layer conversion spacing between the first lens group and the second lens group.

* * * * *